United States Patent [19]

Dolash et al.

[11] Patent Number: 4,983,817

[45] Date of Patent: Jan. 8, 1991

[54] BACKGROUND COMPENSATING BAR CODE READERS

[75] Inventors: Thomas M. Dolash, Worthington; Paul G. Andus, Powell; Mark E. O'Loughlin, Columbus, all of Ohio

[73] Assignee: Battelle Memorial Institute, Columbus, Ohio

[21] Appl. No.: 392,171

[22] Filed: Aug. 10, 1989

Related U.S. Application Data

[63] Continuation-in-part of Ser. No. 317,392, Mar. 1, 1989, abandoned.

[51] Int. Cl.$^5$ .............................................. G06K 7/10
[52] U.S. Cl. ..................................... 235/462; 235/455; 235/491; 250/271; 250/226
[58] Field of Search .............. 235/437, 455, 462, 472, 235/491, 465; 250/566, 226, 271, 569; 382/12; 106/20-23

[56] References Cited

U.S. PATENT DOCUMENTS

| | | | |
|---|---|---|---|
| 3,180,988 | 4/1965 | Burkhardt et al. | 235/491 X |
| 3,207,910 | 9/1965 | Hirschfeld et al. | 250/226 |
| 3,483,388 | 12/1969 | Ogle et al. | 235/491 X |
| 3,946,203 | 3/1976 | Hecht et al. | 235/491 X |
| 4,724,309 | 2/1988 | Greene | 235/491 X |

OTHER PUBLICATIONS

"Noncontact Code Application", Technical Paper Presented by Second Advanced Tech. Con., U.S. Postal Service, Washington, D.C., 1986.
"Mechanized Sorting of Mail Using the Index", Damen, J. T. W., Proceedings of the Institution of Mech. Engineers, pp. 31-36, May 1986.
"Advances in High Speed Phosphor Printing", Evans, D., Paper C82/86, Proceedings of the Institution of Mech. Engineers, pp. 23-29, May 1986.

Primary Examiner—Stuart S. Levy
Assistant Examiner—Steven M. duBois
Attorney, Agent, or Firm—Philip M. Dunson

[57] ABSTRACT

Methods and apparatus for reading a luminescent and substantially transparent bar code 1 on a background surface 2 whose reflectance may vary over the coded area. Light 7 scans (70), and excites luminescence 8 in, the bar code 1. The light 7 also reflects (9) without luminescence from the background surface 2 of the bar code 1. A first electrical or optical signal 11 is provided (4) responsive to the reflected nonluminescent light 9, and a second electrical or optical signal 10 is provided (4) responsive to the luminescent 8. Typically the first signal 11 is processed (5) to provide a third signal 31 that varies with background reflectance substantially as does the second signal 10; and the second and third signals 10, 31 are combined (5) to provide a fourth signal 12 that is substantially independent of background reflectance in the coded area, and which is decoded (6) to provide the desired reading.

27 Claims, 5 Drawing Sheets

BACKGROUND COMPENSATING BAR CODE READERS

The U.S. Postal Service has rights in this invention pursuant to Contract No. 104230-84-H-0003.

This is a continuation in part of U.S. patent application Ser. No. 07/317,392, filed Mar. 1, 1989, and now abandoned.

FIELD

This invention relates to methods and apparatus for reading luminescent bar codes. It is especially useful with substantially transparent bar codes that are printed or applied in other ways on backgrounds of variable reflectance in the visible and adjacent ranges.

BACKGROUND

The technology of encoding information on various articles with bar codes is well known. Traditional bar code systems rely on the differences in reflection of the reading light from the black (light-absorbing) bars and the white (light-reflecting) spaces of the bar code. A typical laser bar code reader scans the beam from a helium-neon laser across the bar code. Photodetectors monitor the beam's reflectance from the bars and spaces, and the resultant electronic signals are processed and decoded.

Bar codes on mail can be used in a system for automatic sorting of mail in the postal system.[2] For this application, black bars would be difficult to read over dark backgrounds and could obscure underlying printed material. For this reason luminescent, substantially transparent bar codes are preferred. Luminescent bar codes may include both fluorescent and phosphorescent materials that can be formulated into relatively clear inks that do not obscure the underlying printed material on mail pieces.

Bar code readers require sufficient contrast between bars and spaces to permit accurate differentiation. With fluorescent bars, a major problem has been the background fluorescence of the paper in the spaces of the bar code. Various ways of compensating for differences in background fluorescence of the spaces have been devised by use of optical filters and electronic circuitry (U.S. Pat. No. 3,207,910 Hirschfeld) and development of fluorescent inks that can be activated by ultraviolet light to fluoresce at longer wavelengths (e.g. 580 nm peak) where the background fluorescence of the paper is less (U.S. Pat. No. 4,186,020, Wachtel). While methods are known to deal with the background fluorescence of the paper, which may appreciably affect the signal from spaces in the bar code, they do not address the problem of the background under the bars of the bar code.

One type of system uses fluorescent ink in bar codes that fluoresce orange-red at a wavelength of 600 nm when illuminated with ultraviolet light with a wavelength of 365 nm [3]. It was observed that the fluorescent signal on white envelopes was much larger than on dark envelopes. Thus, the problem was presumed to be partly related to the use of fluorescent substances ("whiteners") in white paper, resulting in a substantial dynamic range of signal. Thus, the detection circuit had to cope with white and dark paper. Advanced self-adapting thresholding techniques were said to have solved this problem of dealing with different envelope materials. However, the problem of background differences within the code area was noted by the same author to cause damage to the signal and errors in decoding. Based on the erroneous assumption that "whiteners" in the paper were the problem, a change from ultraviolet to green light for exciting fluorescence did not solve the problem.

Another system uses phosphorescent ink in bar codes to avoid the problems of fluorescent materials in the paper or printing inks.[4] However, differences in phosphorescent signals over white and manilla envelopes were still encountered. To minimize the problem, a scanning system was used ahead of the jet printer to adjust the number of ink droplets per bar in accordance with the color density of the envelope. However, this system would not be able to cope with variations in background within the code area.

Still another type of fluorescent system is based on dyes that fluoresce in the far-red and near-infrared region of the spectrum.[2] In this region, postal materials have little or no background fluorescence and the signal is obtained primarily from the fluorescence of the bar code. A further advantage of this system is that the helium-neon laser of the conventional bar code scanner can be used as the excitation light for the fluorescent dye. The principal modification to the reader is replacement of the optical filter on the conventional system which is designed to pass the reflected red light of scanner while blocking ambient light. The replacement is an optical filter that blocks the reflected red light of the helium-neon laser but passes the fluorescent signal of longer wavelength. Since the fluorescent bars produce the stronger electronic signal (in contrast to the conventional black and white system where the spaces produce the stronger electronic signal), the voltage signal must be inverted for feed to the conventional decoder circuitry.

With this red-stimulated fluorescent system, as with the ultraviolet-stimulated fluorescent system and the phosphorescent system, there is the common problem of the effect of the background on the dynamic range of the luminescent signal. While methods are known that might compensate for differences in envelope material, they would not solve the problem of variations in the background within the code area. Specifically, a relatively clear bar code of luminescent material printed over dark typewritten material presents the problem of localized variations in signal intensity that can cause errors in decoding. Variation in background can occur within the width of a single bar or space of the code.

The exact details of the mechanism that causes the quantitative increase in luminescence over lighter backgrounds is not known and probably differs slightly for fluorescent and phosphorescent materials. However, a qualitative explanation of the effects observed can be provided for the example of a bar code ink using a dye that is fluorescent in the far-red and near infrared region, where the fluorescence of the envelope or printed material can be neglected.

First consider the example of a bar formed of dispersed fluorescent dye particles in a relatively clear ink on an ideally non-reflective surface. When the excitation light impinges on the dye particle, it fluoresces in all directions. However, only that light fluorescing in the direction of the collector contributes to the signal strength. Second consider the same bar on a reflective surface. A portion of the light from the fluorescent particle is transmitted through the clear ink and is reflected from the reflective surface back to the collector and adds to the fluorescent signal. Thus, the fluorescent light received by the collector comprises two components: direct fluorescence and reflected fluorescence. The direct fluorescence is primarily a function of the dye concentration in the ink whereas the reflected fluorescence is a function of reflectance of the reflective background surface that the fluorescent ink covers.

It is known that the relative contribution of the background can be minimized with thicker bar codes. However, for noncontact printing of bar codes with jet printers there are practical limitations on film thickness. Thus, the thin fluorescent ink films of a jet printer accentuate the problem of variable background reflectance. It is known that if the ink is made less clear, the contribution of the reflected fluorescent component can be minimized. In the extreme case of an opaque ink the reflected fluorescent component can be made negligible and only the direct light of surface fluorescent particles would provide the signal, which would be independent of the background. However, any significant increase of the opacity of the bar code ink would be counter to the objective of not obscuring the underlying printed material.

For successful decoding with luminescent bar codes, it is necessary that the processed signal from the code delivered to the decoder have practically constant amplitude, independent of any variations in the collected luminescent signal due to localized variations in background reflectance. Thus, means are needed for automatically compensating for the total collected luminescent signal for the reflected component of the luminescent light according to the localized background surface reflectance in the area of the scanning beam. The present invention provides such means.

It is well known to use optical filters to separate light of different frequencies. For example, in conventional bar code readers, a red filter is used to block frequencies of ambient light and pass only the frequency of the red light of the helium-neon laser to measure the reflected red light from black on white bar codes. To adapt this conventional system to reading red-stimulated infrared fluorescence, the conventional ambient-light filter is replaced by an optical filter that blocks the red light of the helium-neon laser and passes the fluorescent light in the far-red and near-infrared range of the spectrum.[2] The amount of red excitation light to be blocked by the filter depends on the amount reflected by the background on which the fluorescent bar code is printed. It is greatest for a reflective white surface and least for a dark light-absorbent surface such as black printing ink.

If, in addition to blocking the reflected red excitation light in order to selectively measure fluorescent light, separate means are provided to simultaneously measure the amount of reflected excitation light, a separate electrical or optical signal can be obtained that is related to the reflectance of the surface underlying the fluorescent bar code; and this signal can be used to simultaneously compensate the amplitude of the fluorescent signal by appropriate electronic or optical circuitry to provide a relatively constant amplitude of the identification signal fed to the decoder. The above combination of dual light collection and detection means with background compensating electronic or optical circuitry means comprise a significant feature of the present invention, which significantly improves the ability of the system to successfully decode fluorescent bar codes printed with transparent ink over backgrounds of variable reflectance.

This invention is described in further complete detail in a technical publication 1 by two of the inventors and another coauthor, which is incorporated herein by reference as fully as if it were presented in complete text. Also similarly incorporated by reference are the other documents appended to the specification in the file of the parent application for this patent, and hereinafter identified.

DRAWINGS

Figure 6:
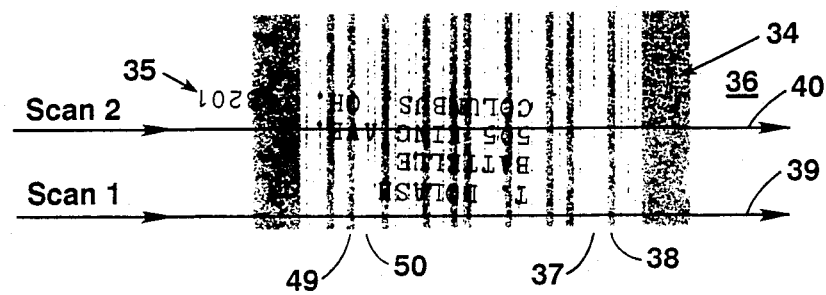
FIG. 6 is a typical fluorescent bar code printed over a typed address and used for demonstration of the present invention.
Figure 7:
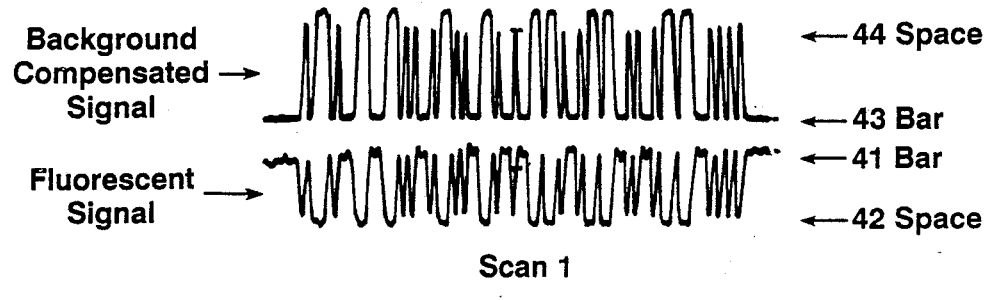

FIG. 7 comprises oscilloscope traces of the fluorescent voltage signal (lower trace) and background compensated inverted voltage signal (upper trace) for a reference scan of the bar code shown in FIG. 6 across a region of substantially uniform background reflectance (Scan 1) in the code area.

Figure 8:
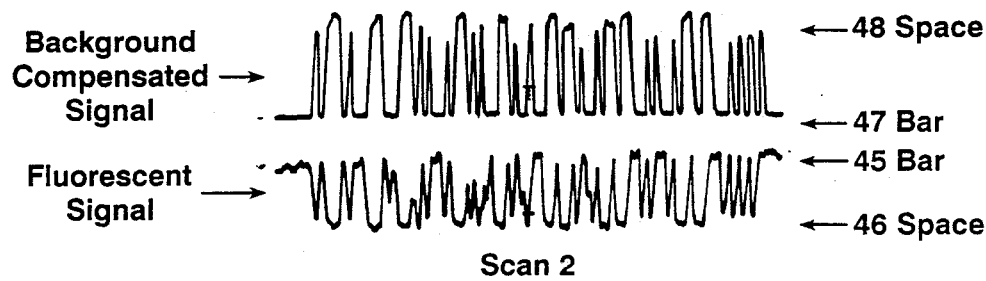

FIG. 8 comprises oscilloscope traces of the fluorescent voltage signal (lower trace) and background compensated inverted voltage signal (upper trace) for a demonstration scan of the bar code shown in FIG. 6 across the address (Scan 2) of variable background reflectance in the code area.

Figure 1:
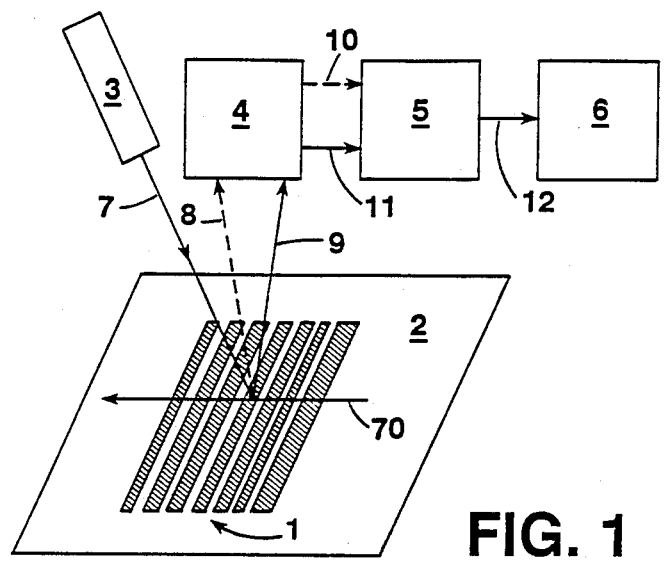
FIG. 1 is a schematic representation of a typical fluorescent bar code reader according to the present invention showing the principal means comprising excitation of fluorescence, dual collection and detection of fluorescent and reflected excitation light, and electronic or optical circuitry for signal processing and decoding.
Figure 9:
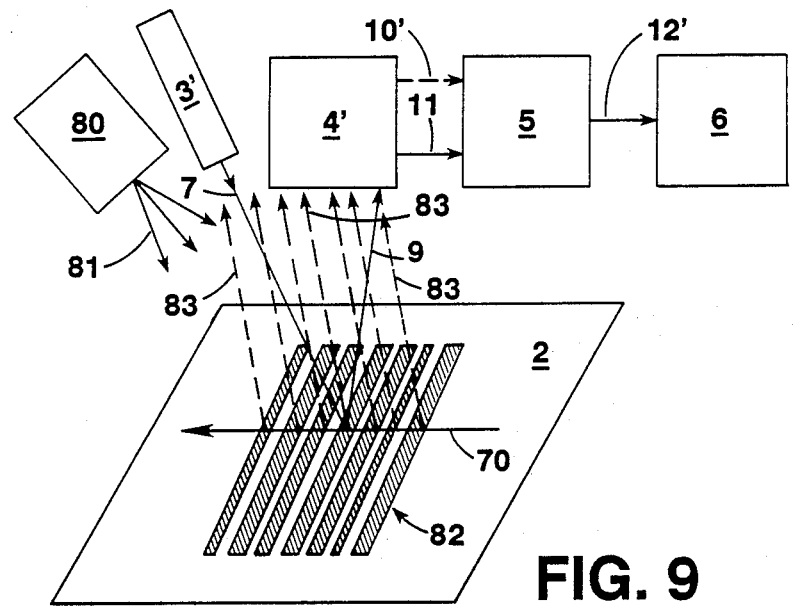

FIG. 9 is a schematic representation of a phosphorescent bar code reader according to the present invention modified relative to FIG. 1 to incorporate an additional light source to briefly stimulate phosphorescence before scanning the bar code.

Figure 10:
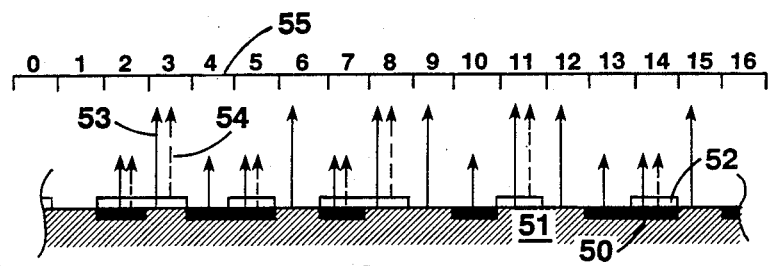
Figure 11:
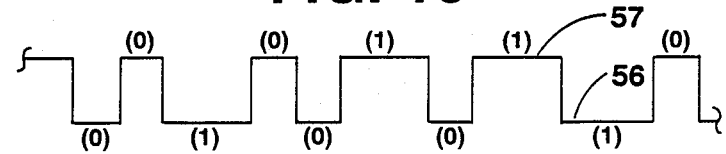
Figure 12:
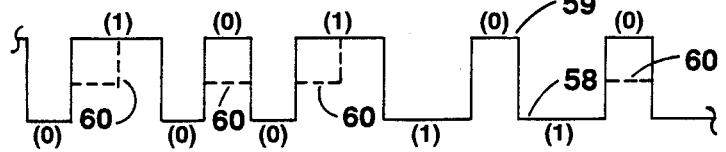

FIGS. 10-12 are schematic representations for two superimposed bar codes showing a cross section of a fluorescent bar code superimposed on a black on white bar code (FIG. 10). the resultant voltage signal for the black on white bar code (FIG. 11). and the resultant voltage signal for a background-compensated voltage signal for the fluorescent bar code (FIG. 12).

Figure 13:
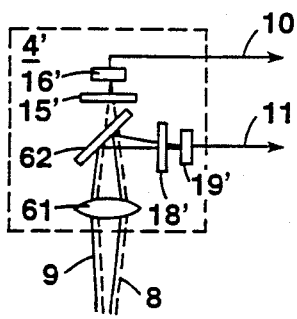
Figure 3:
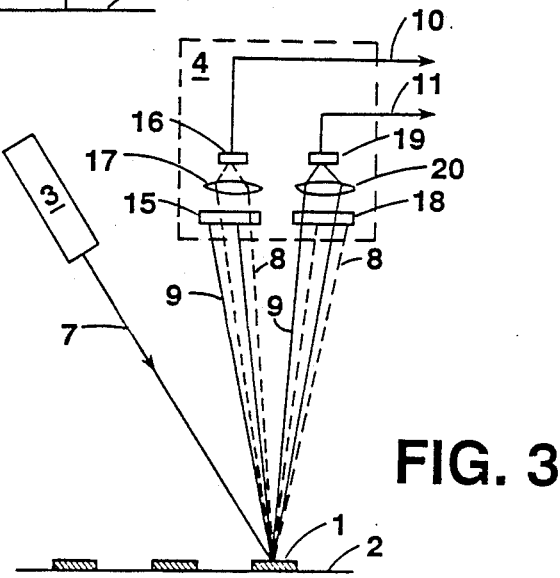
FIG. 3 is a schematic representation of typical dual detection means comprising optical filters, collection optics, and light detectors.

FIG. 13 is a schematic representation of typical dual detection means comprising a beam splitter, in an alternative configuration to FIG. 3.

Figure 5:
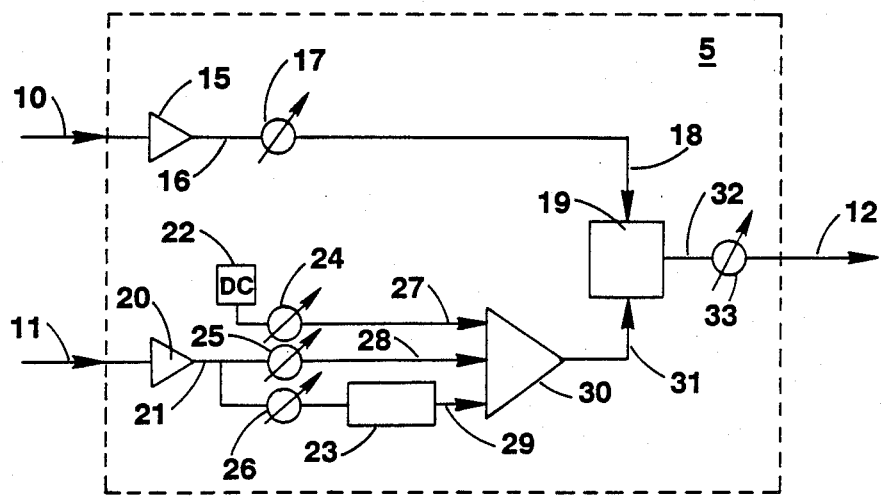
FIG. 5 is a schematic diagram of typical circuitry for signal processing according to the present invention to produce a signal for decoding of constant amplitude independent of background reflectance.
Figure 14:
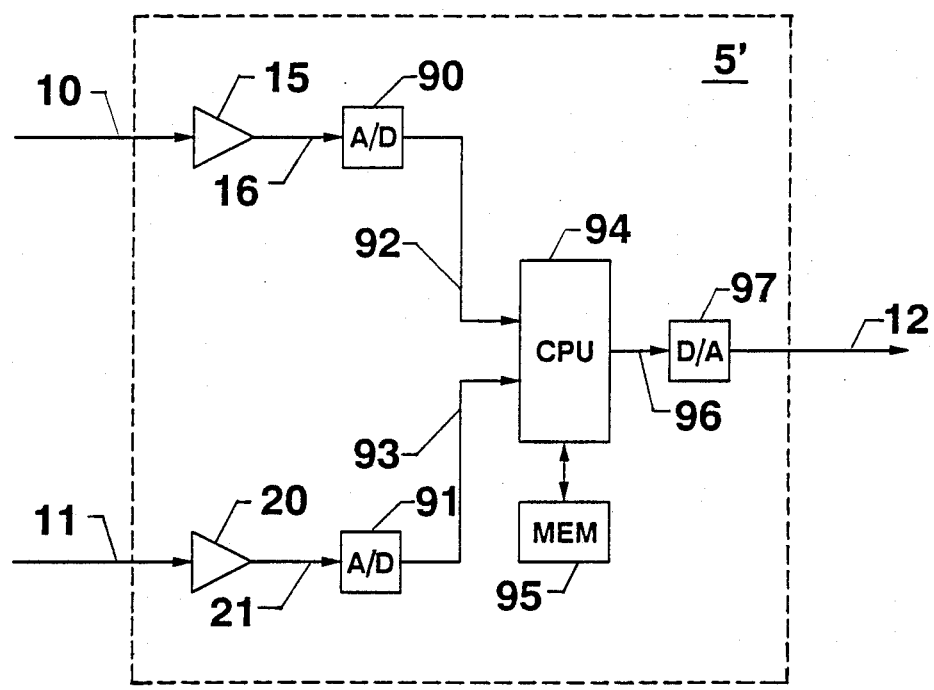

FIG. 14 is a schematic diagram, similar to FIG. 5, of other typical circuitry for signal processing according to the present invention to produce a signal for decoding of constant amplitude independent of background reflectance.

CARRYING OUT THE INVENTION

Referring now to FIG. 1, typical apparatus according to the present invention for reading a fluorescent bar code 1 printed on a surface 2 which may have variable background reflectance in the code area, such as a postal card or envelope, comprises four main components: A light source means 3 to scan the bar code 1, a dual light detection means 4, electronic or optical circuitry means 5 to compensate for background reflectance, and bar-code decoding means 6.

In a typical embodiment of the present invention wherein the bar code 1 comprises transparent fluorescent material, the excitation light source means 3 comprises a conventional helium-neon laser in conjunction with a conventional decoder 6 that are both commercially available and used for conventional black on white bar code readers. Dual detection means 4 and electronic or optical circuitry means 5 for background compensation are included also for reading bar codes that fluoresce in the far red and near-infrared region of the spectrum.

When the excitation light 7 from the light source 3 impinges on a bar 1, the dye material of the bar fluoresces and emits light 8 at a wavelength longer than the wavelength of the excitation light 7. A portion of the fluorescent light 8 and the reflected excitation light 9 are collected by dual detection means 4 (see also FIG. 3 and FIG. 13). which separates the light of different wavelengths and produces electrical or optical signals 10, 11 related to the intensity of the fluorescent light 8 and reflected excitation light 9 respectively. The fluorescent light signal 10 is compensated by the reflected excitation light signal 11 by electronic or optical circuit means 5 (see also FIG. 5 and FIG. 14) to produce a resultant background-compensated electric signal 12 which is fed to standard decoder means 6.

Figure 2:
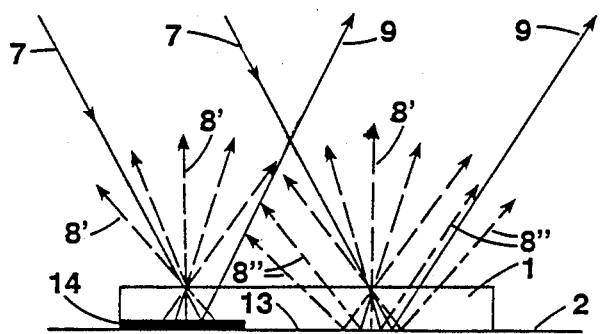
FIG. 2 is a schematic representation of a cross section of a fluorescent bar illustrating the effect of the background reflectance on the fluorescent light signal.

The amount of fluorescent light 8 from a fluorescent bar 1 that reaches the collection means 4 depends in part on the local reflectance of the background surface 2 as illustrated in FIG. 2. For example, over a white or highly reflective surface 13 the direct fluorescent light 8' emanating from excited fluorescent dye molecules in the direction of the collection means 4 is supplemented by reflected fluorescent light 8" from the surface 13; while over a black or poorly reflecting surface 14 there is negligible reflected fluorescent light 8" toward the collection means 4. An additional factor might be that since more of the excitation light is reflected from the light reflective surface than from the dark surface, the dispersed fluorescent dye molecules in the transparent bar can be exposed to greater excitation light 7, 9 (i.e. reflected plus incident). Regardless of the exact mechanism, it is observed that the total fluorescent light 8 collected from identical bars varies over a wide range depending on the reflectance of the background surface 2 under the bar. Conventional decoders cannot operate satisfactorily with such a large dynamic signal range. Thus, there is a need to compensate for the amount of fluorescent light 8 in accordance with the reflectance of the background 2. The reflected excitation light 9 provides the suitable simultaneous signal to correct for background reflectance.

The dual detection means 4 is designed to collect and separately measure the light intensity in a first frequency band corresponding to the reflected excitation light 9 and to measure separately the light intensity in a second frequency band corresponding to the fluorescent light 8. In one typical embodiment of the invention, half of the dual detection means 4 shown in FIG. 3 comprises a first optical filter 15 to block reflected excitation light 9 and to pass the fluorescent light 8, which is focused on a first detector 16 by collection optics 17. The other half of the dual detection means 4 comprises a second optical filter 18 which blocks fluorescent light 8 and passes the reflected excitation light 9, which is focused on a second detector 19 by collection optics 20.

FIG. 13 shows an alternative arrangement of the dual detection means 4' comprising collection optics 61 and a beam splitter 62. For example, the beam splitter 62 can be a dichroic mirror which passes fluorescent light 8 to a first detector 16' and reflects the reflected excitation light 9 to a second detector 19'. Additionally, optical filters 15' 18' can be used to insure separation of the collected light 8. 9 into frequency bands corresponding to reflected excitation light 9 and fluorescence 8 which has a longer wavelength than the wavelength of the excitation light 9.

Figure 4:
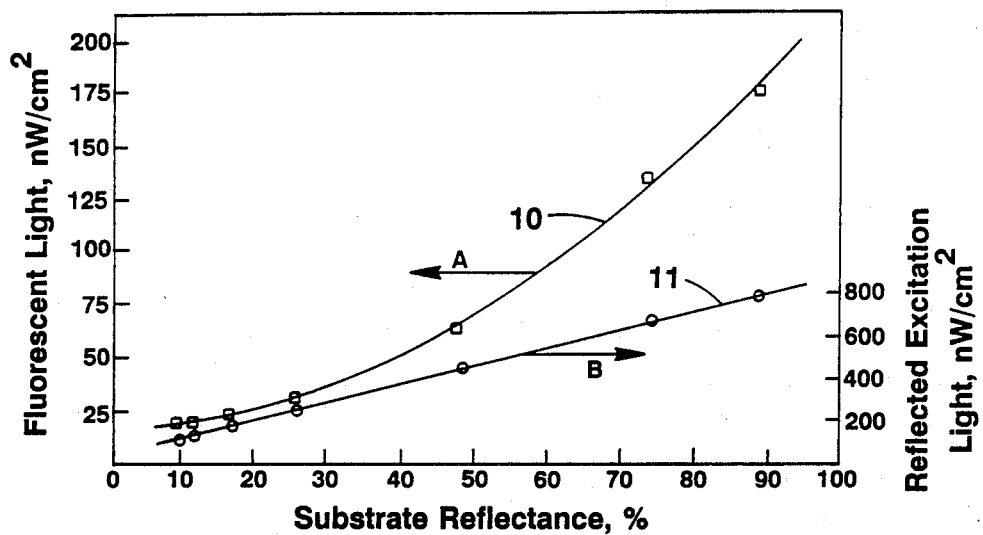
FIG. 4 is a graph of fluorescent light intensity and reflected excitation light intensity versus substrate background reflectance.

Quantitative values for the variation of the electrical signals 10, 11 from the dual detection means 4 were determined from measurements of transparent fluorescent bars printed over black ink backgrounds of known reflectance (i.e. standard gray scales). FIG. 4 comprises curves of the fluorescent light signal (curve A) and the reflected excitation light signal (curve B) as functions of substrate reflectance. The measurements are shown in units of power per unit area of detector (nW/cm²), which are proportional to detector current as converted to a voltage signal. For example, the reflected excitation light produces a voltage signal V' that is linear with respect to surface reflectance x:

$$V' = a' + b'32 \quad (1)$$

Similarly, the fluorescent light signal is a parabolic curve for which the voltage V can be adequately approximated by a second order polynomial as follows:

$$V = a + bx + cx^2 \quad (2)$$

Electronic circuitry means 5 is designed to compare the fluorescent light electrical signal 10 and the reflected excitation light electrical signal 11 to produce a single electrical signal 12 corresponding to detection of fluorescence for a bar 1 and for which the magnitude of the electrical signal 12 is essentially constant independent of the background reflectance under the bar. This can be accomplished by a typical embodiment of the present invention in which the electronic circuitry means comprises a polynomial ratioing circuit.

By combining equations 1 and 2, the fluorescent light signal V can be expressed as a second order polynomial of the reflected excitation light signal V':

$$V = a'' + b''V' + c''V'^2 \quad (3)$$

where $$a'' = a - ba'/b' + ca'^2/b'^2,$$
$$b'' = b/b' - 2ca'/b'^2, \text{ and}$$
$$c'' = c/b'^2.$$

Thus, the ratio of the fluorescent light signal V to a polynomial function V'' of the reflected excitation light V' is a constant k independent of the background reflectance x:

$$V/V'' = k \quad (4)$$

As shown in FIG. 5, typical electronic circuitry means 5 to accomplish polynomial ratioing comprises a transimpedance amplifier 15 to convert the fluorescent current signal 10 to a voltage signal 16 followed by an adjustable voltage amplifier 17 to produce the desired level of voltage signal 18 as input to the numerator side of a ratioing device 19. The reflected excitation light current signal 11 is converted to a voltage signal 21 in a transimpedance amplifier 20. The voltage signal 21 as a function of surface reflectance, which is linear in accordance with Equation 1, is converted to a voltage signal 31, which is polynomial in accordance with Equations 3 and 4, by use of a multiplier 23 and a direct current source 22 and suitable adjustment of variable impedances 24, 25, 26. The three resultant voltage component signals 27, 28, 29 corresponding to the constant, linear, and squared terms of the polynomial voltage equation respectively are combined in a summing device 30 to produce the desired voltage signal 31 for input to the denominator side of the ratioing device 19. The output of the ratioing device 19 is a voltage signal 32 that is constant in amplitude, independent of background surface reflectance under fluorescent bars, and essentially zero in the absence of fluorescent bars, when the code is scanned. The background compensated voltage signal 32 is adjusted in relative amplitude by an adjustable amplifier 33 to provide the desired level of voltage signal 12 for feeding to the decoder 6 (FIG. 1 or 9).

Verification of correct adjustment of the variable impedances 24. 25. 26 of the electronic circuitry means can be accomplished by scanning a series of fluorescent bars printed over backgrounds of differing reflectance and ascertaining that a constant amplitude voltage signal 12 is obtained at the output of the electronic circuitry means.

In principle, the electronic circuitry described transforms curve B of FIG. 4 to a characteristic shape approximating curve A. This is typically accomplished by use of the multiplier 23 to produce the squared term for a second order equation. Additional components could be added to the circuit to produce a cubed term for a third order equation but generally the added expense is not warranted or necessary for the limited increase in accuracy.

Typically, the amount of fluorescent, light 8 is less than the amount of reflected excitation light 9 with the result that the current signal 10 is less than the current signal 11 and the voltage signal 16 is less than the voltage signal 21. However, the adjustable amplifier 17 and/or the variable impedances 24, 25, 26 can be adjusted such that the voltage signals 18, 31 to the ratio device 19 are nearly equal, in which case the ratio is unity. However the ratio of the voltage signals 18. 31 can be less than or more than unity.

Although a preferred embodiment of the invention has been described with the use of a ratio device 19 which electronically divides the numerator voltage 18 by the denominator voltage 31, other devices might be used. For example, in lieu of the ratio device 19, a subtraction device could be used to subtract one voltage signal 31 from the other voltage signal 18 and the resultant differential voltage would be constant and independent of background reflectance under the fluorescent bars. The differential voltage would have to be clipped to zero on negative voltage levels. Other alternatives may include digital electronic circuitry for the division (ratioing) or the subtraction, or optical circuitry, analog and/or digital, or various combinations of electronic and/or optical circuitry.

As shown in FIG. 14, typical electronic circuitry means 5' to accomplish polynomial ratioing digitally comprises a transimpedance amplifier 15 to convert the fluorescent current signal 10 to a voltage signal 16. The voltage signal is then converted to digital signals 92 by means of an analog-to-digital convertor 90. The reflected excitation light current signal 11 is converted to a voltage signal 21 by a transimpedance amplifier 20. This voltage signal is converted to digital signals 93 by an analog-to-digital convertor 91. The digital signals 92 and 93 are typically seven to twelve bits wide and may be stored by a central processing unit (CPU) 94 in a memory 95. The CPU 94 then generates digital signals 96 by dividing the signals 92 by a digital polynomial function of the signals 93. A voltage signal 12 is generated from the digital signals 96 by means of a digital-to-analog convertor 97, and is fed to the decoder 6 (FIG. 1 or 9).

One application of the present invention is in reading bar codes applied to letter mail wherein the bar code contains the zip code information. Typically, the bar code is applied to a letter with an ink jet printer, and bar code readers are part of the total system for automatic mail sorting by zip code. A system using a red light stimulated infrared fluorescent bar code has been developed which has the desired feature of not obscuring printing underlying the near transparent bar code. However, the difference in reflectivity of the background surface can affect the fluorescent signal and cause errors in reading the bar code. The present invention was demonstrated for this application to show that such errors in reading the bar code can be eliminated.

For a demonstration of the present invention, a fluorescent bar code 34 was prepared over a typed address 35 on a light buff manilla envelope 36 as shown in FIG. 6. The fluorescent bar code was prepared by coating the address area 35 with a thin layer of fluorescent ink and using a photographic mask and ultraviolet light to form the bar code 34.

The ink used was a clear formulation to which was added a fraction of a percent by weight of an infrared fluorescing dye (HIDC Iodide, obtained from Exciton Chemical Company, Inc., Dayton. Ohio). Since this dye has some absorption in the red end of the visible spectrum (to absorb the helium-neon laser light used for excitation) a pale blue color is imparted to the ink. However, the color is faint and underlying information on the mailpiece is clearly discernible as shown in FIG. 6.

The bar code used was an "interleaved 2 of 5| bar code wherein a wide bar corresponds to 1 and a narrow bar corresponds to 0 and five bar bits encode a first numeral. Also a wide space corresponds to 1 and a narrow space corresponds to 0 and five space bits encode a second numeral, etc.

A commercial bar code scanner and reader (Symbol Technologies Model LS 6500) designed for reading black on white bar codes was used with modifications to the detection means 4 as shown in FIG. 3 and modification of the electronic circuit means 5 as shown in FIG. 5 in accordance with the present invention. The excitation light source 3 was a helium-neon laser (fixed mounted laser scanner with galvanometer mirror scanning of the bar code). The commercial decoder designed for black bars (minimum voltage signal) on white background (maximum voltage signal) was used by inverting the voltage signal 12 to the opposite sense required for fluorescent bars (maximum voltage signal) and spaces, or absence of fluorescence (minimum voltage signal).

The principal modifications to the commercial bar code reader were the additions of background compensation circuits 5 as shown in FIG. 5 and use of a dual detection means 4 as shown in FIG. 3 by addition of a parallel photodetector 16, collection optics 17 and appropriate optical filter 15 to pass fluorescent light 8 and block reflected excitation light 9. A colored-glass low-pass filter (Schott RG 695) effectively blocks the reflected red light (633 nm) of the helium-neon laser and passes most of the fluorescent light for the particular dye used in the bar code, which fluoresces over the approximate wavelength range of 650 nm to 750 nm with a peak at about 700 nm. The parallel optical filter 18 is typically a narrow band pass filter that passes reflected excitation light (633 nm) and blocks ambient light and fluorescent light below about 600 nm and above 650 nm.

The demonstration comprised two scans 39, 40 of the bar code. The first scan 39 of the bar code was in an area where the background in the code area was essentially uniform. The results are shown in the oscilloscope traces in FIG. 7. The lower oscilloscope trace shows the voltage corresponding to the fluorescent signal 18 (FIG. 5) that is fed to the ratioing device 19. The voltage peaks 41 correspond to fluorescent bars and the voltage minimums 42 correspond to spaces in the bar code 34 of FIG. 6 reading left to right. The upper oscilloscope trace of FIG. 7 shows the voltage corresponding to the background compensated signal 12, which has been inverted for feeding to the decoder 6. By the voltage inversion, the voltage minimums 43 (actually zero volts) correspond to the bars and the voltage maximums 44 correspond to the spaces in the bar code 34. As expected, because of the nearly uniform background 36 covered by the first scan 39, either voltage signal (18 or 12 in FIG. 3) correctly shows the sequence of bars and spaces of the bar code 34 (compare 41 vs. 43 and 42 vs. 44) for decoding. However, the background compensated signal is noticeably freer from noise.

For the second scan 40 across the extremely nonuniform background of the black typed address "505 KING AVE.", the adverse effect on the fluorescent signal 18 is apparent in the lower oscilloscope trace of FIG. 8 compared to the similar oscilloscope trace in FIG. 7. However, the upper oscilloscope trace of FIG. 8 with background compensation is essentially similar to the corresponding upper oscilloscope trace in FIG. 7.

Specifically, the adverse effect of the dark local background of the letter "V" under the wide bar 49 and of the letter "A" under the narrow bar 50 is shown by the reduced amplitude of the fluorescent signal 45 in FIG. 8 compared to the fluorescent signal 41 in FIG. 7. Similar adverse effects on the amplitude of the fluorescent signal 45 can be seen in FIG. 8 corresponding to the dark background of the letters "KING" under the bars in FIG. 6. The above illustrates the typical problem of the prior state of the art which resulted in errors in decoding or failure to decode. These decoding problems are eliminated by the present invention in which automatic correction for local background reflectance provides the correct signal sequence of bars and spaces to the decoder, as graphically illustrated in FIG. 8 (e.g. compare bar signal 47 with bar signal 45). The demonstration has shown by the two scans 39, 40 over typical but different backgrounds that the present invention can produce nearly identical voltage signals for accurate decoding independent of the local background reflectance in the coded area.

The present invention has been demonstrated for a large local variation in background reflection (essentially black to white) and would obviously work equally well for any intermediate reflection values (gray scale) or where the background varied in color. The invention works equally well not only where bar codes are to be read on surfaces that may be essentially uniform in reflectance in the coded area for an article, but also where the reflectance might vary from article to article (e.g. a mix of white and manilla envelopes).

This invention is not limited to such embodiments as those described above and demonstrated with reference to fluorescent dyes that fluoresce in the far red and near infrared region of the spectrum and can be excited by the red light of the helium-neon laser. By suitable choice of the excitation light source 3 and fluorescent dye for the bars 1 of the bar code, the present invention can be used in other wavelength regions of the electromagnetic spectrum, such as the visible spectrum below 630 nm and the invisible range above about 700 nm.

For example, for some applications it might be desirable that the bar code be invisible to the unaided eye. Thus, dyes may be selected that fluoresce in the infrared (e.g. 800 nm to 1500 nm) and have negligible reflection of light below about 700 nm so as to be invisible. For these dyes, the excitation light may be provided by lasers that produce light above about 700 nm.

For example, a bar code that is not readily visible to the unaided eye can be printed with clear ink containing a fluorescent dye (e.g. IR 125 dye) that emits in the infrared (typically 900 nm wavelength) when scanned by excitation light from a laser diode (typically 780 nm wavelength). Since most materials that absorb light in the infrared region also absorb slightly in the red region, the bar code may have a slight tint. The visibility would depend on the background and the slight tint might be barely visible on a pure white background but practically invisible on most colored backgrounds. The bar code might be printed in an area having the same background tint as the bars.

The present invention can be used with a variety of fluorescent dyes that fluoresce in various portions of the visible light spectrum and using various excitation lights as appropriate. For example, some bar code systems for mail sorting use ultraviolet light (365 nm) and dyes that fluoresce in the red range of the spectrum (about 600 nm) where the fluorescence of the background is minimal. Thus the excitation light source 3 in FIG. 1 can be ultraviolet light (250 nm to 400 nm) and the reflected excitation light 9 and fluorescent light 8 in the range of 500 nm to 620 nm can be separately detected by the dual detection means 4 with appropriate choice of optical filters 15 and 16 for the wavelengths to be passed and blocked.

This invention is broadly applicable to most types of markings that are luminescent, such as fluorescent and phosphorescent markings that are essentially transparent, and where the luminescent light and the resultant electrical or optical signal can be affected by the background reflectance underlying the marking.

For example, phosphorescent inks have been used in bar codes by the British Post Office [4] based on the melamine-formaldehyde system. When pre-excited by a suitable light source (250 nm to 430 nm), such dyes produce a bright yellow/green afterglow from phosphorescent emission (400 nm to 600 nm) with peak emission around 500 nm that is sustained for one to several hundred milliseconds, with gradually decreasing intensity with time. By scanning and measurement of the phosphorescent emission from the bar code after appropriate time delay after the excitation light has been turned off, the background fluorescent emission from whiteners in the envelope is minimized, providing high contrast of the bar and space signals. However, the phosphorescent light signals still are subject to variation in amplitude resulting from variation in background reflection of the different envelope materials. Methods of compensating for variations in background reflectance have involved adjustment of the amount of ink applied in ink jet printing of the bar code. An alternative approach based on the present invention is to use a dual light source comprising a first light source for stimulating phosphorescent emission from the bar code such as an ultraviolet light source which briefly illuminates the bar code immediately prior to scanning the bar code with a second light source selected to measure background reflectance such as a helium-neon laser (633 nm) which does not significantly activate fluorescence in the background surface (i.e. the spaces between phosphorescent bars of the bar code).

FIG. 9 shows a typical embodiment of the present invention similar to that of FIG. 1, but modified for reading phosphorescent bar codes 82 by the addition of a first excitation light source 80, which is briefly activated to produce a broad beam of light 81 to stimulate phosphorescent emission 83 in all of the bar code 82 before scanning with a second light source 3' that does not excite either phosphorescence or fluorescence in the bar code area.

The dual light detection means 4 is similar to that shown in FIG. 3 except that the optical filter 15' is selected to pass only phosphorescent light 83, so as to provide an electrical signal 10' that corresponds to the intensity of phosphorescent light 83 rather than of fluorescent light as previously described for other embodiments of this invention. Otherwise the electronic circuitry means 5 and the decoding means 6 are similar to those described above wherein the electrical signal 12' has been compensated for background reflectance.

For reading phosphorescent bar codes, typical light detection means use light admitting slots that correspond in dimensions to the bar of the bar code and such light detection means can be modified in the practice of this invention by addition of a light source such as a helium-neon laser and suitable beam shaping optics with typical beam splitters such that the typical slot passes red light to the bar and collects reflected red light from the background under the bar and said reflected red light can be used as the signal to compensate the phosphorescent light signal for background reflectance.

One application of the present invention can be to increase the amount of information in the area that can be allotted to bar codes. For example, a typical black on white bar code can provide only a limited amount of information in terms of bits of code per linear dimension in the normal scan direction. The amount of information can be doubled by superimposing a fluorescent bar code on top of a typical black on white bar code. The present invention allows for independent accurate reading of the black on white bar code using conventional bar code reader technology along with the accurate reading of the fluorescent bar code, independent of the differences in background reflectance of the underlying black on white bar code. An example, as shown in FIGS. 10–12, illustrates this application and also illustrates the advantages of the present invention over the prior state of the art.

FIG. 10 is a cross section of a segment of a first bar code comprising black bars 50 on a white background 51 and a superimposed second bar code comprising fluorescent bars 52 printed over the black on white bar code. Assuming that the bar codes are scanned from left to right with a helium-neon laser, both reflected red light 53 and fluorescence light 54 in the far red and near-infrared region emanates from the fluorescent bars in each incremental time interval 55. The height of the arrows shown in FIG. 10 is indicative of the relative amount of light in each time interval 55.

Considering first only the reflected red light. FIG. 11 shows the idealized relative voltage amplitude of the reflected red light. The minimum voltage signal 56 corresponds to the black bars and in "interleaved 2 of 5" symbology the 5-bit digital signal 01001 corresponds to the decimal numeral 2. The maximum voltage signals 57 of 00110 corresponds to the decimal numeral 0. FIG. 12 shows the background compensated voltage signal 12 (FIG. 1) from fluorescent light that has been corrected for background reflectance of the underlying black on white bar code in accordance with the present invention. The latter minimum voltage signals 58 of 00011 correspond to the decimal numeral 7 and the maximum voltage signals 59 of 10100 correspond to the decimal numeral 5.

The combined numeric information of 2075 in the segment of signals shown in FIGS. 11 and 12 can be decoded by various schemes. For example, a conventional black on white bar-code reader may be used ahead of the bar-code reader of the present invention as shown in FIG. 1. Alternatively, a portion of the reflected red excitation light signal 11 may be bypassed through conventional signal processing means to a separate decoder means (not shown in FIG. 1) to read the black on white bar code.

As shown in FIGS. 10 and 12, the present invention provides the correct voltage signal in the time intervals 2, 5, 7 and 14, where typical apparatus in the prior art would yield defective voltage signals 60, indicated by the dashed lines in FIG. 12, and thus would not correctly read the code from the fluorescent bars.

The above application of the present invention has particular utility where a practically invisible infrared fluorescing bar code is printed over a conventional black on white bar code on products or articles and the invisible bar code is used for special product control or other purposes.

The present invention can be used with various methods of scanning the bar code such as by scanning the excitation light beam across the bar code, as is typically accomplished with a movable mirror, or by scanning the light detection means across the bar code using suitable optics focused on the bar code, or (as indicated at 70 in FIGS. 1 and 9) by moving the surface 2 containing the bar code 1 relative to a fixed light source 3 and fixed light detection means 4.

REFERENCES (1) Dolash, T.M., Andrus, P.G., and Stockum, L.A., "Novel Bar Coding System for Nonletter Mail", Technical Paper presented at Third Advanced Technology Conference sponsored by the U.S. Postal Service, Washington, D.C., May 3-5 1988.

(2) Dolash, T.M., Andrus, P.G.. and Smith, B.T., "Noncontact Code Application", Technical Paper presented at Second Advanced Technology Conference sponsored by the U.S. Postal Service, Washington, D.C. 1986.

(3) Damen. J.T.W., "Mechanized Sorting of Mail Using the Index", Paper C66/86, International Conference on Postal Engineering. Proceedings of the Institution of mechanical Engineers, pp. 31-36, May 13-14 1986.

(4) Evans, D., and Spicer, C.J., "Advances in High Speed Phosphor Printing", Paper C82/86, International conference on Postal Engineering, Proceedings of the Institution of Mechanical Engineers, pp. 23-29, May 13-14, 1986.

Copies of the above references are appended to the specification in the file of the parent application for this patent. Also similarly appended are copies of a schematic diagram of a polynomial ratio processor used in a typical embodiment of the present invention and a block diagram of a typical high speed bar code scanner receiver/processor, labelled "FIG. 1. Polynomial Ratioing Schematic" and "FIG. 2. Signal Processing Block Diagram", respectively.

While the forms of the invention herein disclosed constitute presently preferred embodiments, many others are possible. It is not intended herein to mention all of the equivalent forms or ramifications of the invention. It is to be understood that the terms used herein are merely descriptive rather than limiting, and that various changes may be made without departing from the spirit or scope of the invention.

We claim:

1. Apparatus for reading a luminescent bar code on a background surface whose reflectance may vary over the coded area, comprising
    means for providing light to scan, and to excite luminescence in, the bar code,
    means for providing light to scan, and to reflect without luminescence from the background surface of, the bar code,
    means responsive to the reflected nonluminescent light for providing a first signal.
    means responsive to the luminescence for providing a second signal, and
    means responsive to the first and second signals for providing an output that is substantially independent of background reflectance in the coded area.

2. Apparatus as in claim 1, wherein the output providing means comprises
    means for providing a third signal that is substantially independent of background reflectance in the coded area, and
    means for decoding the third signal.

3. Apparatus as in claim 2, wherein the means for providing the first, second, and third signals comprise digital means.

4. Apparatus as in claim 3, wherein the digital means comprise means for converting the reflected nonluminescent light into a digital first signal, means for converting the luminescence into a digital second signal, and means for providing a digital third signal responsive to the ratio of the second signal and a predetermined function of the first signal.

5. Apparatus as in claim 3, wherein the digital means comprise means for converting the reflected nonluminescent light into a digital first signal, means for converting the luminescence into a digital second signal, and means for providing a digital third signal responsive to the difference between the second signal and a predetermined function of the first signal.

6. Apparatus as in claim 1, wherein the output providing means comprises
    means responsive to the first signal from reflected nonluminescent light for providing a third signal that varies with background reflectance substantially as the second signal from the luminescence varies with background reflectance,
    means responsive to the second and third signals for providing a fourth signal that is substantially independent of background reflectance in the coded area, and
    means for decoding the fourth signal.

7. Apparatus as in claim 6, wherein the means for providing the first, second, and third signals comprise analog means.

8. Apparatus as in claim 1, wherein the bar code is substantially transparent.

9. Apparatus as in claim 1, wherein the first, second, third, and fourth signals are electrical signals.

10. Apparatus as in claim 9, wherein the means for providing the first and second electrical signals comprise photodetecting means.

11. Apparatus as in claim 1, wherein the first, second, third, and fourth signals are optical signals.

12. Apparatus as in claim 1, wherein the light providing means comprises laser means for providing red light that excites a dye in the bar code to fluoresce in a band of longer wavelengths in the far red and near infrared region of the electromagnetic spectrum.

13. Apparatus as in claim 12, wherein the laser means comprises a helium-neon laser.

14. Apparatus as in claim 1, wherein the means for providing the first and second signals comprise means for separating the light into a first wavelength band corresponding to nonluminescent light and a second wavelength band corresponding to the luminescence, and optical means for collecting and focusing light in each wavelength band on separate means for providing separate output signals responsive to the light in each wavelength band.

15. Apparatus as in claim 14, wherein the light separating means comprises light filters.

16. Apparatus as in claim 14, wherein the light separating means comprises a dichroic beam splitter.

17. Apparatus as in claim 1, wherein the decoding means comprises a decoder that is responsive to the fourth signal and whose output indicates either the presence of a bar or the absence of a bar in the coded area.

18. Apparatus as in claim 1, wherein the amplitude of the third signal varies with background reflectance in a manner that can be represented by a polynomial.

19. Apparatus as in claim 18, in which the polynomial is a second order equation of amplitude as a function of background reflectance.

20. Apparatus as in claim 1, wherein the second and third signals are combined by ratioing means to provide the fourth signal of substantially constant maximum amplitude.

21. Apparatus as in claim 1, wherein the second and third signals are combined by subtraction means to provide the fourth signal of substantially constant maximum amplitude.

22. Apparatus as in claim 1, wherein the means for providing light to excite luminescence in the bar code comprises an ultraviolet light source that is activated briefly prior to scanning the bar code to provide phosphorescence in the material of the bars, and the means for providing light that is reflected without luminescence from the background surface during scanning of the bar code comprises a light source providing light of wavelength in the range of about 600 to 900 nanometers.

23. Apparatus as in claim 1, wherein the light providing means comprises laser means for providing light in the near infrared region that excites a dye in the bar code to fluoresce in a band of wavelengths in the infrared region longer than the wavelength of the excitation light.

24. Apparatus as in claim 1, wherein the same light excites the luminescence and provides the nonluminescent light that is reflected from the background surface.

25. A method for reading a luminescent bar code on a background surface whose reflectance may vary over the coded area, comprising
providing a beam of light focused to a small area and containing at least one predominant frequency band,
scanning the beam across the bar code,
selectively collecting reflected nonluminescent light in a first frequency band,
selectively collecting light in a second frequency band predominantly resulting from luminescence of the bar code,
converting the collected light in the first frequency band into a first signal responsive to the reflectance of the background surface,
converting the collected light in the second frequency band into a second signal responsive to the amount of luminescent light.
modifying the first signal to provide a third signal that varies with background reflectance substantially as does the second signal.
combining the second and third signals to provide a fourth signal of substantially constant amplitude and substantially independent of the local background reflectance under the luminescent material of the bar code, and
decoding the information in the fourth signal.

26. A method as in claim 25, wherein the luminescent bar code contains dyes that fluoresce in the far red and near infrared region and the light is provided by laser means that simultaneously stimulates fluorescence while scanning the bar code to provide reflected light without luminescence responsive to the reflectance of the background surface.

27. A method as in claim 26, wherein the luminescent bar code is substantially transparent and is applied over a visible bar code, and both bar codes are read using the same light source and using separate signal processing means for each bar code.

* * * * *

UNITED STATES PATENT AND TRADEMARK OFFICE
CERTIFICATE OF CORRECTION

PATENT NO. : 4,983,817
DATED : January 8, 1991
INVENTOR(S) : Thomas M. Dolash et al It is certified that error appears in the above-identified patent and that said Letters Patent is hereby corrected as shown below:

Column 4, line 53, "." should be -- , --.

Column 4, line 54, "." should be -- , --.

Column 6, line 32, "32" should be -- x --.

Column 6, line 53, "∆" should be -- " --.

Column 10, line 8, cancel ".".

Column 13, line 11, "mechanical" should be -- Mechanical --.

Column 13, line 15, "conference" should be -- Conference --.

Signed and Sealed this

Nineteenth Day of May, 1992

Attest:

DOUGLAS B. COMER

*Attesting Officer*   *Acting Commissioner of Patents and Trademarks*